United States Patent
Muramatsu et al.

(10) Patent No.: US 11,547,115 B2
(45) Date of Patent: Jan. 10, 2023

(54) WETTABLE AGROCHEMICAL COMPOSITION

(71) Applicants: NIPPON KAYAKU CO., LTD., Tokyo (JP); MEIJI SEIKA PHARMA CO., LTD., Tokyo (JP)

(72) Inventors: Yoshinori Muramatsu, Ibaraki (JP); Hidetoshi Shirakura, Ibaraki (JP); Atsushi Sato, Kanagawa (JP); Mitsuyuki Yabuzaki, Kanagawa (JP); Shigeru Ueno, Kanagawa (JP)

(73) Assignees: NIPPON KAYUKU CO., LTD., Tokyo (JP); MMAG CO., LTD., Tokyo (JP)

(*) Notice: Subject to any disclaimer, the term of this patent is extended or adjusted under 35 U.S.C. 154(b) by 50 days.

(21) Appl. No.: 16/972,095

(22) PCT Filed: Jun. 7, 2019

(86) PCT No.: PCT/JP2019/022668
§ 371 (c)(1),
(2) Date: Dec. 4, 2020

(87) PCT Pub. No.: WO2019/235602
PCT Pub. Date: Dec. 12, 2019

(65) Prior Publication Data
US 2021/0219552 A1    Jul. 22, 2021

(30) Foreign Application Priority Data
Jun. 8, 2018   (JP) .............................. JP2018-110567

(51) Int. Cl.
| A01N 47/06 | (2006.01) |
| A01N 25/14 | (2006.01) |
| A01N 25/24 | (2006.01) |
| A01N 25/04 | (2006.01) |
| A01N 25/30 | (2006.01) |
| A01N 25/06 | (2006.01) |
| A01N 37/40 | (2006.01) |
| A01N 43/42 | (2006.01) |
| A01N 57/10 | (2006.01) |
| A01P 13/00 | (2006.01) |

(52) U.S. Cl.
CPC .............. *A01N 47/06* (2013.01); *A01N 25/14* (2013.01); *A01N 25/24* (2013.01); *A01N 25/30* (2013.01)

(58) Field of Classification Search
CPC ........ A01N 47/06; A01N 25/14; A01N 25/24; A01N 25/30; A01N 25/04; A01N 25/06; A01N 37/40; A01N 43/42; A01N 57/10; A01P 13/00
See application file for complete search history.

(56) References Cited

U.S. PATENT DOCUMENTS

| 5,165,934 A | 11/1992 | Wada et al. |
| 2007/0203181 A1 | 8/2007 | Yamamoto et al. |
| 2008/0214634 A1 | 9/2008 | Konze et al. |
| 2009/0118125 A1 | 5/2009 | Kobayashi et al. |
| 2013/0045989 A1 | 2/2013 | Tanigakiuclu et al. |
| 2015/0164068 A1 | 6/2015 | Endo et al. |
| 2015/0351384 A1 | 12/2015 | Sato et al. |

FOREIGN PATENT DOCUMENTS

| CN | 1993328 | 7/2007 |
| CN | 102884050 | 1/2013 |
| CN | 106852325 | 6/2017 |
| JP | 3-167107 | 7/1991 |
| JP | 9-136805 | 5/1997 |
| JP | 2005-336170 | 12/2005 |
| JP | 2006-503084 | 1/2006 |
| JP | 2014-144944 | 8/2014 |
| WO | 2006/013896 | 2/2006 |
| WO | 2006/134651 | 12/2006 |
| WO | 2007/088978 | 8/2007 |
| WO | 2011/105349 | 9/2011 |
| WO | 2014/013908 | 1/2014 |
| WO | 2014/119620 | 8/2014 |

OTHER PUBLICATIONS

English language translation of the International Preliminary Report on Patentability and Written Opinion of the International Searching Authority dated Dec. 17, 2020 in corresponding International Patent Application No. PCT/JP2019/022668.

(Continued)

*Primary Examiner* — Trevor Love
(74) *Attorney, Agent, or Firm* — Wenderoth, Lind & Ponack, L.L.P.

(57) ABSTRACT

Disclosed is a wettable agrochemical composition comprising an agrochemical active component (A), which is a compound represented by the following formula (I) or an agriculturally and horticulturally acceptable acid addition salt thereof, one or more additives, and one or more surfactants, the wettable agrochemical composition being solid at 30° C. This wettable agrochemical composition has excellent physical properties of the formulation and storage stability.

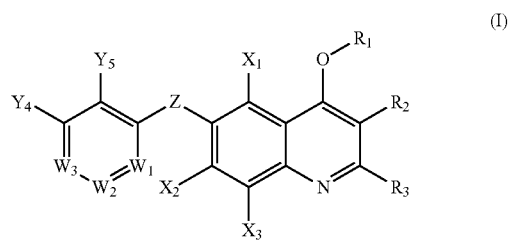

(I)

12 Claims, No Drawings

OTHER PUBLICATIONS

International Search Report (ISR) dated Aug. 27, 2019 in International (PCT) Application No. PCT/JP2019/022668.
Chinese Office Action dated Jul. 9, 2021 in Chinese Patent Application No. 201980038130.5, with English translation.

WETTABLE AGROCHEMICAL COMPOSITION

CROSS REFERENCE TO RELATED APPLICATIONS

This patent application claims priority based on Japanese Patent Application No, 2018-110567 (filed on Jun. 8, 2018) that is a patent application filed previously in Japan. This previous patent application is incorporated herein by reference in its entirety.

TECHNICAL FIELD

The present invention relates to an agrochemical composition, more specifically to a wettable agrochemical composition.

BACKGROUND ART

Various agrochemicals are used to control pests to crops at present. Among them, aqueous suspension agrochemical compositions (hereinbelow, also referred to as a "flowable formulations") are water-based agrochemical formulations, of which utility value has been enhanced as safety agrochemical formulations, in view of considerations to sprayers and the environment.

However, in a flowable formulation, crystals of an active component are suspended in water. Thus, depending on the type of active component, hydrolysis occurs during storage or a small amount of the active component dissolves and recrystalizes to thereby cause crystals of the active component to grow. Crystal growth of the active component in the formulation lowers the controlling effect, and moreover, arouses concern in hardcaking and nozzle clogging upon spraying due to deterioration in its physicochemical characteristics. Thus, it is important to suppress the crystal growth within an acceptable range in the flowable formulation. Further, when the particle diameter of the crystals of the active component in the composition has an influence on the effect on the subject pest, an increase in the particle diameter due to crystal growth may severely lower the effect. Accordingly, it is desired to persistently suppress the crystal growth of the active component in the composition over a long period of time.

In Patent Literature 1 and Patent Literature 2, in a flowable formulation containing one of quinoline compounds, 2-ethyl-3,7-dimethyl-4-methoxycarbonyloxy-6-(4-trifluoroparamethoxyphenoxy)-quinoline (generic name: flometoquin), as the active component, the particle diameter of flometoquin may increase depending on the formula of a composition or storage conditions, and the efficacy of the effective component may not be sufficiently exerted. Patent Literature 1 and Patent Literature 2 disclose that, in order to solve this problem, as a method of suppressing crystal growth of flometoquin, blending a water-soluble cellulose derivative or polyvinyl phenol in the composition or blending a specific surfactant in the composition enables crystal growth to be suppressed.

Patent Literature 3 mentions that a composition containing diafenthiuron and various biocidal compounds extends the active spectrum to pests to be controlled and a synergistic effect of the effective components also occurs. However, in examples, specific effective components are limited to combinations of diafenthiuron and fenoxycarb or abamectin, and whether combinations of diafenthiuron and all of the effective components are effective or not is unknown. In an emulsifiable concentrate or suspension stock liquid of a mixed agent, problems such as mutual dissolution of the active components, recrystallization, crystal growth, separation of the liquid phase, aggregation, hardcaking, and decomposition of the effective component may occur during long-term storage.

Patent Literature 4 mentions that, in a mixed agent containing imidacloprid and an organophosphorus compound, use of amorphous silica enables a mixed agent having excellent stability to be provided. However, this literature describes the stability of the content, but there is no description of the physical properties of the formulation of a wettable powder after long-term storage. This method is also effective to specific agrochemical active components, but whether the method is effective to all of agrochemical active components or not is unknown.

Patent Literature 5 mentions that mixing a phthalamide compound with some active materials enhances insecticidal activity and acaricidal activity and a synergistic effect can be obtained. However, examples provide description only on an emulsifiable concentrate. In such an emulsifiable concentrate, the effective component precipitates during storage, or a chemical hazard may occur in plants due to use of an organic solvent. Emulsifiable concentrates may not be optimal depending on an effective component because the emulsifiable concentrates are combustible and agrochemical formulations recently have tended to shift to water-based formulations.

PRIOR ART DOCUMENT

Patent Document

[Patent document 1] JP 2014-144944 A
[Patent document 2] WO 2014/119620
[Patent document 3] JP H9-136805 A
[Patent document 4] JP H3-167107 A
[Patent document 5] JP 2006-503084 A

SUMMARY OF THE INVENTION

Flometoquin is a solid having a low water solubility, and in order to achieve the efficacy of the active component, its particle size has to be smaller to a certain extent. Thus, flowable formulations, which can be produced by wet pulverization, are suitable for flometoquin. However, flowable formulations are water-based formulations, which has caused a concern that flometoquin is susceptible to the influence of hydrolysis due to an extended storage period.

Additionally, from the viewpoint of labor saving in agriculture, mixed agents have been commonly developed and sold in the market as agrochemical formulations. However, some combination of active components cannot be mixed due to their natures that cause a problem in the stability after mixing. Particularly, the formulation characteristics of each active component greatly influence the mixing of liquid formulations, and may cause problems such as mutual dissolution of the active components, recrystallization, crystal growth, aggregation, hardcaking, and decomposition of the effective components, which does not allow some combination of active components to be mixed. Accordingly, with respect to ones that may be subject to crystal growth depending on the formula, such as flometoquin, the stability of formulations after mixing is particularly concerned.

The present inventors have found that converting flometoquin to a wettable agrochemical formulation such as a wettable powder or a granular wettable powder can suppress changes in the appearance after an extended storage period and crystal growth, and thus enables the formulation to maintain good physical properties. Further, the present inventors have also found that converting flometoquin to a wettable agrochemical formulation solves the problems of mixed agents mentioned above, and thus enables the flometoquin to be mixed with other active components with which a liquid formulation has difficulty of mixing. The present invention is based on these findings.

That is, it is an object of the present invention to provide a wettable agrochemical composition having excellent physical properties of the formulation and storage stability.

The present invention includes the following inventions.

(1) A wettable agrochemical composition, comprising a agrochemical active component (A), which is a compound represented by the following formula (I) or an agriculturally and horticulturally acceptable acid addition salt thereof, one or more additives, and one or more surfactants, the wettable agrochemical composition being solid at 30° C.: [Chem. 1]

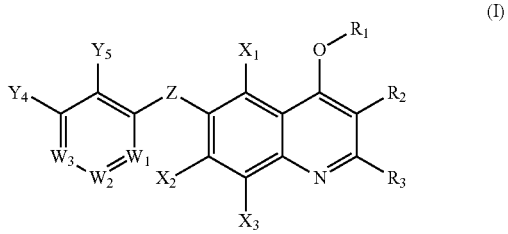

(I)

[wherein, $R_1$ represents $COR_4$ or $COOR_5$ (wherein, $R_4'$ and $R_5$ each represent a $C_{1-4}$ alkyl group), $R_2$ represents a $C_{1-4}$ alkyl group, $R_3$ represents a $C_{1-4}$ alkyl group, $X_1$ and $X_2$ each independently represent a hydrogen atom, or a $C_{1-4}$ alkyl group optionally substituted with a halogen atom, provided that both $X_1$ and $X_2$ do not simultaneously represent a hydrogen atom, $X_3$ represents a hydrogen atom, $W_1$, $W_2$, and $W_3$ represent C—$Y_1$, C—$Y_2$, and C—$Y_3$, respectively, $Y_1$, $Y_2$, $Y_3$, $Y_4$, and $Y_5$ each independently represent a hydrogen atom, a $C_{1-8}$ alkyloxy group (this $C_{1-8}$ alkyloxy group is substituted with one or more, the same or different, halogen atom(s), and/or a $C_{1-4}$ alkyloxy group substituted with one or more, the same or different, halogen atom(s)), or a halogen atom, provided that at least one of $Y_1$, $Y_2$, $Y_3$, $Y_4$, and $Y_5$ represents a $C_{1-8}$ alkyloxy group (this $C_{1-8}$ alkyloxy group is substituted with one or more, the same or different, halogen atom(s), and/or a $C_{1-4}$ alkyloxy group substituted with one or more, the same or different, halogen atom(s)), or alternatively adjacent two of $Y_1$, $Y_2$, $Y_3$, $Y_4$, and $Y_5$ may together represent —O—$(CH_2)_n$—O— substituted with one or more halogen atom(s) (wherein n is 1 or 2), and Z represents an oxygen atom].

(2) The wettable agrochemical composition according to (1), further comprising one or more other agrochemical active components (B).

(3) The wettable agrochemical composition according to (1) or (2), wherein the agrochemical: active component (A) is in a form of a wet-pulverized product obtained by wet pulverization along with a surfactant, and a volume median diameter of the agrochemical active component (A) in a suspension liquid obtained upon wet pulverization is from 0.1 to 5.0 μm.

(4) The wettable agrochemical composition according to (2), wherein a mixture of the agrochemical active component (A) and the agrochemical active component (B) is in a form of a wet-pulverized product obtained by wet pulverization along with a surfactant, and a volume median diameter of the agrochemical active component (A) and the agrochemical active component (B) in a suspension liquid obtained upon wet pulverization is from 0.1 to 5.0 μm.

(5) The wettable agrochemical composition according to any one of (1) to (4), wherein the agrochemical active component (A) is 2-ethyl-3,7-dimethyl-4-methoxycarbonyloxy-6-(4-trifluoroparamethoxyphenoxy)-quinoline (generic name: flometoquin).

(6) The wettable agrochemical composition according to any one of (1) to (5), wherein the agrochemical active component (B) is at least one component selected from the group consisting of insecticide effective components and fungicide effective components.

(7) The wettable agrochemical composition according to any one of (1) to (6), wherein the agrochemical active component (B) is at least one agent selected from the group consisting of organophosphorus-based, carbamate-based, pyrethroid-based, neonicotinoid-based, nicotine-based, butenolide-based, cyclic diene organochlorine-based, benzene dicarboxamide-based, nereistoxin-based, IGR-based, pyrrole-based, macrolide-based, juvenile hormone analogue-based, benzoylurea-based, spinosyn-based, quinazoline-based, phenylpyrazole-based, oxadiazine-based, hydrazinecarboxamide-based, phenoxybenzylamide-based, pyridineazomethine-based, pyridinecarboxyamide-based, organosilicon-based, tetronic acid-based, β-ketonitrile derivative-based, phosphine-based, METI agent-based, BT agent-based, copper agent-based, sulfur agent-based, polyhaloalkylthio-based, sodium bicarbonate agent-based, organochlorine-based, benzimidazole-based, dicarboximide-based, carboxyamide-based, phenylamide-based, dimethomorph-based, cymoxanil-based, cyanoimidazole-based, acylalanine-based, oxazolidinone-based, butyrolactone-based, hydroxy-(2-amino-)pyrimidine-based, isoxazole-based, isothiazolone-based, carboxylic acid-based, thiophanate-based, N-phenylcarbamate-based, benzamide-based, thiazolecarboxamide-based, phenylurea-based, pyrimidineamine-based, pyrazolecarboxamide-based, phenylbenzamide-based, phenyloxoethyl thiopheneamide-based, pyridinyl ethyl benzamide-based, furancarboxamide-based, oxathiincarboxamide-based, thiazolecarboxamide-based, pyrazolecarboxamide-based, pyridinecarboxamide-based, methoxyacrylate-based, methoxycarbamate-based, oxyiminoacetic acid-based, oxyiminoacetamide-based, oxazolinedione-based, dihydrodioxazine-based, imidazolinone-based, benzylcarbamate-based, cyanoimidazole-based, sulfamoyltriazole-based, dinitrophenylcrotonic acid-based, 2,6-dinitroaniline-based, triphenyltin-based, thiophenecarboxamide-based, thiophenecarboxamide-based, thiazolopyrimidylamine-based, anilinopyrimidine-based, enopyranuronic acid antibiotic-based, hexopyranosyl antibiotic-based, glucopyranosyl antibiotic-based, tetracycline antibiotic-based, allyloxyquinoline-based, quinazoline-based, phenylpyrrole-based, dicarboximide-based, phosphorothiolate-based, dithiolane-based, aromatic hydrocarbon-based, 1,2,4-thiadiazole-based, carbamate-based, polypeptide-based, piperazine-based, pyrimidine-based, pyridine-based, imidazole-based, triazole-based, triazolinthione-based, morpholine-based, piperidine-based, spiroketalamine-based, hydroxyanilide-based, aminopyrazolinone-based, thiocarbamate-based, allylamine-based, peptidylpyrimidine nucleoside-based, cinnamic acid amide-based, valinamide carbamate-based, mandelic acid amide-based, isobenzofuranone-based, pyrroloquinolinone-based, triazolobenzothiazole-based, cyclopropanecarboxamide-based, carboxamide-based, propionamide-based, benzothiadiazole-based, benzisothiazole-based, thiadiazolecarboxamide-based, polysaccharide-based, cyanoacetamide-oxime-based, ethylphosphonate-based, phthalamicacid-based, benzotriazine-based, benzenesulfonic acid-based, pyridazinone-based, thiocarbamate-based, phenylacetamide-based, benzophenone-based, benzoylpyridine-based, guanidine-based, cyanomethylenethiazolidine-based, pyrimidinonehydrazone-based, dithiocarbamate-based, phthalimide-based, chloronitrile-based, sulfamide-based, triazine-based, quinone-based, quinoxaline-based, maleimide-based, and mesolon-based agents.

(8) The wettable agrochemical composition according to any one of (1) to (7), wherein the agrochemical active component (B) is at least one agent selected from the group consisting of diazinon, acephate, azamethiphos, azinphos-ethyl, azinphos-methyl, cadusafos, chlorethoxyfos, chlorfenvinphos, chlormephos, fenitrothion, isoxathion, chlorpyrifos, chlorpyrifos-methyl, coumaphos, cyanophos, dimeton-S-methyl, dichlorvos, dicrotophos, dimethoate, dimethylvinphos, ethylthiometon, EPN, ethion, ethoprophos, famphur, fenamiphos, fenthion, fosthiazate, heptenophos, imicyafos, isofenphos, mecarbam, methamidophos, methidathion, mevinphos, monocrotophos, naled, omethoate, oxydemeton-methyl, parathion, methyl parathion, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, prothiofos, malathion, PAP, DEP, EPN, methomyl, thiodicarb, benfuracarb, carbosulfan, alanycarb, acrinathrin, allethrin, bifenthrin, bioallethrin, bioresmethrin, cycloprothrin, cyfluthrin, cyhalothrin, cypermethrin, cyphenothrin, deltamethrin, empenthrin, esfenvalerate, etofenprox, fenpropathrin, fenvalerate, flucythrinate, flumethrin, fluvalinate, halfenprox, imiprothrin, kadethrin, permethrin, phenothrin, prallethrin, cyhalothrin, tefluthrin, phthalthrin, tralomethrin, transfluthrin, DDT, methoxychlor, imidacloprid, thiamethoxam, clothianidin, acetamiprid, nitenpyram, thiacloprid, dinotefuran, nicotine sulfate, sulfoxaflor, flupyradifurone, hydroprene, kinoprene, methoprene, pyriproxyfen, chlordane, benzoepin, flubendiamide, chlorantraniliprole, cyantraniliprole, thiocyclam, cartap, bensultap, thiosultap, chromafenozide, methoxyfenozide, halofenozide, tebufenozide, chlorfluazuron, trigard, amitraz, hydramethylnon, acequinocyl, fluacrypyrim, fenazaquin, fenpyroximate, pyrimidifen, pyridaben, tebufenpyrad, tolfenpyrad, derris extract, chlorfenapyr, DNOC, sulfluramid, emamectin, lepimectin, milbemectin, abamectin, spinosad, spinetoram, bistrifluron, diflubenzuron, flucycloxuron, hexaflumuron, lufenuron, novaluron, noviflumuron, teflubenzuron, triflumuron, buprofezin, cyromazine, pyrifluquinazon, fipronil, ethiprole, fenoxycarb, indoxacarb, metaflumizone, spirodiclofen, spiromesifen, spirotetramat, pymetrozine, flonicamid, chloropicrin, sulfuryl fluoride, clofentezine, hexythiazox, diflovidazin, etoxazole, diafenthiuron, azocyclotin, tricyclohexyltin hydroxide, fenbutatin oxide, propargite, tetradifon, silafluofen, aluminum phosphide, calcium phosphide, hydrogen phosphide, zinc phosphide, cyenopyrafen, cyflumetofen, azadirachtin, benzoximate, bifenazate, bromopropylate, quinomethionate, sodium aluminum fluoride, dicofol, pyridalyl, inorganic copper, organic copper, inorganic sulfur, polycarbamate, benalaxyl, furalaxyl, metalaxyl, oxadixyl, ofurace, bupirimate, dimethirimol, ethirimol, hydroxyisoxazole, octhilinone, oxolinic acid, benomyl, carbendazol, fuberidazole, thiabendazole, thiophanate, thiophanate-methyl, diethofencarb, zoxamide, ethaboxam, pencycuron, fluopicolide, diflumetorim, benodanil, flutolanil, mepronil, isofetamid, fluopyram, fenfuram, carboxin, oxycarboxin, thifluzamide, benzovindiflupyr, bixafen, fluxapyroxad, furametpyr, isopyrazam, penflufen, penthiopyrad, sedaxane, boscalid, azoxystrobin, coumoxystrobin, enoxastrobin, flufenoxystrobin, picoxystrobin, pyraoxystrobin, pyraclostrobin, pyrametostrobin, triclopyricarb, kresoxim-methyl, trifloxystrobin, dimoxystrobin, fenaminstrobin, metominostrobin, orysastrobin, famoxadone, fluoxastrobin, fenamidone, pyribencarb, cyazofamid, amisulbrom, binapacryl, meptyldinocap, dinocap, fluazinam, ferimzone, organotin, silthiofam, ametoctradin, cyprodinil, mepanipyrim, pyrimethanil, blasticidin S, kasugamycin, streptomycin, oxytetracycline, quinoxyfen, proquinazid, fenpiclonil, fludioxonil, chlozolinate, iprodione, procymidone, vinclozolin, edifenphos, iprobenfos, pyrazophos, isoprothiolane, biphenyl, chloroneb, dichloran, quintozene, tecnazene, tolclofos-methyl, echlomezol, iodocarb, propamocarb, prothiocarb, *Bacillus subtilis*, triforine, pyrifenox, pyrixazole, fenarimol, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, prothioconazole, aldimorph, dodemorph, fenpropimorph, tridemorph, fenpropidin, piperalin, spiroxamine, fenhexamid, fenpyrazamine, pyributicarb, naftifine, terbinafine, validamycin, polyoxin, dimethomorph, flumorph, pyrimorph, benthiavalicarb, iprovalicarb, valifenalate, mandipropamid, fthalide, pyroquilon, tricyclazole, carpropamid, diclocymet, fenoxanil, acibenzolar-S-methyl, probenazole, tiadinil, isotianil, laminarin, cymoxanil, fosetyl, tecloftalam, triazoxide, flusulfamide, diclomezine, methasulfocarb, cyflufenamid, metrafenone, pyriofenone, guanidine, flutianil, ferimzone, ferbam, manzeb, maneb, metiram, propineb, thiuram, zineb, captan, difolatan, folpet, TPN, dichlofluanid, tolylfluanid, guazatine, iminoctadine, triazine, dithianon, quinomethionate, fluoroimide, triflumezopyrim, and dicloromezotiaz.

(9) The wettable agrochemical composition according to any one of (1) to (8), wherein the additive is one or two or more materials selected from the group consisting of saccharides, binders, inorganic salts, and mineral powder carriers.

(10) The wettable agrochemical composition according to any one of (1) to (9), wherein the saccharides are selected from the group consisting of lactose, dextrin, starch derivatives, and cellulose derivatives.

(11) The wettable agrochemical composition according to any one of (1) to (10), wherein the binder is selected from the group consisting of polyvinylpyrrolidone, polyvinyl alcohol, methyl cellulose, and carboxymethylcellulose.

(12) The wettable agrochemical composition according to any one of (1) to (11), wherein the inorganic salt is one or two or more inorganic salts selected from the group consisting of potassium dihydrogen phosphate, sodium chloride, potassium chloride, and ammonium sulfate.

(13) The wettable agrochemical composition according to any one of (1) to (12), wherein the mineral powder carrier is one or two or more carriers selected from the group consisting of white clay, diatomaceous earth, and volcanic ash soil.

(14) The wettable agrochemical composition according to any one of (1) to (13), wherein the surfactant is selected from the group consisting of polyoxyethylene alkylether sulfate, polyoxyethylene ether phosphate, polyoxyethylated castor oil, alkylnaphthalenesulfonate-formaldehyde condensate, dioctyl sulfosuccinate, and polycarboxylic acid.

(15) A method for producing the wettable agrochemical composition according to any one of (1) to (14), comprising a step of wet-pulverizing a agrochemical active component (A) along with a surfactant, wherein a volume median diameter of the agrochemical active component (A) in a suspension liquid obtained by wet pulverization is from 0.1 to 5.0 µm.

(16) A method for producing the wettable agrochemical composition according to any one of (2) and (4) to (14), comprising a step of wet-pulverizing a mixture of a agrochemical active component (A) and a agrochemical active component (B) along with a surfactant, wherein the volume median diameter of the agrochemical active component (A) and the agrochemical active component (B) in a suspension liquid obtained by wet pulverization is from 0.1 to 5.0 µm.

(17) The method according to (15) or (16), wherein the agrochemical active component (A) is 2-ethyl-3,7-dimethyl-4-methoxycarbonyloxy-6-(4-trifluoroparamethoxyphenoxy)-quinoline (generic name: flometoquin).

The wettable agrochemical composition of the present invention is characterized in that its physicochemical properties do not change during storage, its storage stability is excellent, and its controlling effect does not deteriorate, satisfying both stabilization of the effect and improved workability during application. Further, according to the present invention, making a higher concentration of the active component, cost reduction of packaging, enhanced stability, and the like also can be achieved.

DETAILED DESCRIPTION OF THE INVENTION

The wettable agrochemical composition of the present invention is solid at 30° C. and includes a agrochemical active component (A), which is a compound represented by the following formula (I) or an agriculturally and horticulturally acceptable acid addition salt thereof, one or more additives, and one or more surfactants:

[Chem. 2]

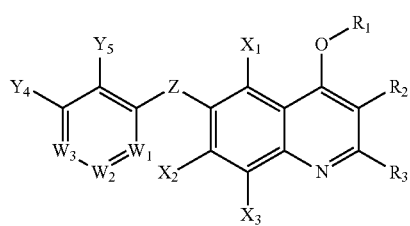

(I)

[wherein,
R$_1$ represents COR$_4$' or COOR$_5$ (wherein, R$_4$' and R$_5$ each represent a C$_{1-4}$ alkyl group),
R$_2$ represents a C$_{1-4}$ alkyl group,
R$_3$ represents a C$_{1-4}$ alkyl group,
X$_1$ and X$_2$ each independently represent a hydrogen atom, or a C$_{1-4}$ alkyl group optionally substituted with a halogen atom, provided that both X$_1$ and X$_2$ do not simultaneously represent a hydrogen atom,
X$_3$ represents a hydrogen atom,
W$_1$, W$_2$, and W$_3$ represent C—Y$_1$, C—Y$_2$, and C—Y$_3$, respectively, Y$_1$, Y$_2$, Y$_3$, Y$_4$, and Y$_5$ each independently represent a hydrogen atom, a C$_{1-8}$ alkyloxy group (this C$_{1-8}$ alkyloxy group is substituted with one or more, the same or different, halogen atom(s), and/or a CA alkyloxy group substituted with one or more, the same or different, halogen atom(s)), or a halogen atom,
provided that at least one of Y$_1$, Y$_2$, Y$_3$, Y$_4$, and Y$_5$ represents a C$_{1-8}$ alkyloxy group (this C$_{1-8}$ alkyloxy group is substituted with one or more, the same or different, halogen atom(s), and/or a C$_{1-4}$ alkyloxy group substituted with one or more, the same or different, halogen atom(s)),
or alternatively adjacent two of Y$_1$, Y$_2$, Y$_3$, Y$_4$, and Y$_5$ may together represent —O—(CH$_2$)$_n$—O— substituted with one or more halogen atom(s) (wherein n is 1 or 2), and
Z represents an oxygen atom].

The agrochemical active component (A) is a compound represented by a general formula (I), and may be one compound included in the general formula (I), or may be a mixture of two or more compounds included in the general formula (I). According to a preferable embodiment of the present invention, the agrochemical active component (A) is 2-ethyl-3,7-dimethyl-4-methoxycarbonyloxy-6-(4-trifluoroparamethoxyphenoxy)-quinoline (generic name: flometoquin).

The wettable agrochemical composition of the present invention may further include one or more other agrochemical active components (B). Examples of the agrochemical active component (B) can include, but are not particularly limited to, insecticide effective components and fungicide effective components. One of these may be used singly, or two or more of these can be used in combination. Specific examples of the agrochemical active component (B) can include ones having a controlling effect on any of Lepidopterous pests, Dipteran pests, Hemipteran pests, Acarine pests, Thysanopteran pests, Coleopteran pests, Hymenopteran pests, Orthopteran pests, Nematode pests, diseases caused by viruses, diseases caused by bacteria, and diseases caused by filamentous fungi.

According to a preferable embodiment of the present invention, the agrochemical active component (B) is at least one agent selected from the group consisting of organophosphorus-based, carbamate-based, pyrethroid-based, neonicotinoid-based, nicotine-based, butenolide-based, cyclic diene organochlorine-based, benzene dicarboxamide-based, nereistoxin-based, IGR-based, pyrrole-based, macrolide-based, juvenile hormone analogue-based, benzoylurea-based, spinosyn-based, quinazoline-based, phenylpyrazole-based, oxadiazine-based, hydrazinecarboxamide-based, phenoxybenzylamide-based, pyridineazomethine-based, pyridinecarboxyamide-based, organosilicon-based, tetronic acid-based, β-ketonitrile derivative-based, phosphine-based, METI agent-based, BT agent-based, copper agent-based, sulfur agent-based, polyhaloalkylthio-based, sodium bicarbonate agent-based, organochlorine-based, benzimidazole-based, dicarboximide-based, carboxyamide-based, phenylamide-based, dimethomorph-based, cymoxanil-based, cyanoimidazole-based, acylalanine-based, oxazolidinone-based, butyrolactone-based, hydroxy-(2-amino-)pyrimidine-based, isoxazole-based, isothiazolone-based, carboxylic acid-based, thiophanate-based, N-phenylcarbamate-based, benzamide-based, thiazolecarboxamide-based, phenylurea-based, pyrimidineamine-based, pyrazolecarboxamide-based, phenylbenzamide-based, phenyloxoethyl thiopheneamide-based, pyridinyl ethyl benzamide-based, furancarboxamide-based, oxathiincarboxamide-based, thiazolecarboxamide-based, pyrazolecarboxamide-based, pyridinecarboxamide-based, methoxyacrylate-based, methoxycarbamate-based, oxyiminoacetic acid-based, oxyiminoacetamide-based, oxazolinedione-based, dihydrodioxazine-based, imidazolinone-based, benzylcarbamate-based, cyanoimidazole-based, sulfamoyltriazole-based, dinitrophenylcrotonic acid-based, 2,6-dinitroaniline-based, triphenyltin-based, thiophenecarboxamide-based, thiophenecarboxamide-based, thiazolopyrimidylamine-based, anilinopyrimidine-based, enopyranuronic acid antibiotic-based, hexopyranosyl antibiotic-based, glucopyranosyl antibiotic-based, tetracycline antibiotic-based, allyloxyquinoline-based, quinazoline-based, phenylpyrrole-based, dicarboximide-based, phosphorothiolate-based, dithiolane-based, aromatic hydrocarbon-based, 1,2,4-thiadiazole-based, carbamate-based, polypeptide-based, piperazine-based, pyrimidine-based, pyridine-based, imidazole-based, triazole-based, triazolinthione-based, morpholine-based, piperidine-based, spiroketalamine-based, hydroxyanilide-based, aminopyrazolinone-based, thiocarbamate-based, allylamine-based, peptidylpyrimidine nucleoside-based, cinnamic acid amide-based, valinamide carbamate-based, mandelic acid amide-based, isobenzofuranone-based, pyrroloquinolinone-based, triazolobenzothiazole-based, cyclopropanecarboxamide-based, carboxamide-based, propionamide-based, benzothiadiazole-based, benzisothiazole-based, thiadiazolecarboxamide-based, polysaccharide-based, cyanoacetamide-oxime-based, ethylphosphonate-based, phthalamic acid-based, benzotriazine-based, benzenesulfonic acid-based, pyridazinone-based, thiocarbamate-based, phenylacetamide-based, benzophenone-based, benzoylpyridine-based, guanidine-based, cyanomethylenethiazolidine-based, pyrimidinonehydrazone-based, dithiocarbamate-based, phthalimide-based, chloronitrile-based, sulfamide-based, triazine-based, quinone-based, qunoxaline-based, maleimide-based, and mesoion-based agents.

According to another preferable embodiment of the present invention, the agrochemical active component (B) is at least one agent selected from the group consisting of diazinon, acephate, azamethiphos, azinphos-ethyl, azinphos-methyl, cadusafos, chlorethoxyfos, chlorfenvinphos, chlormephos, fenitrothion, isoxathion, chlorpyrifos, chlorpyrifos-methyl, coumaphos, cyanophos, dimeton-S-methyl, dichlorvos, dicrotophos, dimethoate, dimethylvinphos, ethylthiometon, EPN, ethion, ethoprophos, famphur, fenamiphos, fenthion, fosthiazate, heptenophos, imicyafos, isofenphos, mecarbam, methamidophos, methidathion, mevinphos, monocrotophos, naled, omethoate, oxydemeton-methyl, parathion, methyl parathion, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, prothiofos, malathion, PAP, DEP, EPN, methomyl, thiodicarb, benfuracarb, carbosulfan, alanycarb, acrinathrin, allethrin, bifenthrin, bioallethrin, bioresmethrin, cycloprothrin, cyfluthrin, cyhalothrin, cypermethrin, cyphenothrin, deltamethrin, empenthrin, esfenvalerate, etofenprox, fenpropathrin, fenvalerate, flucythrinate, flumethrin, fluvalinate, halfenprox, imiprothrin, kadethrin, permethrin, phenothrin, prallethrin, cyhalothrin, tefluthrin, phthalthrin, tralomethrin, transfluthrin, DDT, methoxychlor, imidacloprid, thiamethoxam, clothianidin, acetamiprid, nitenpyram, thiacloprid, dinotefuran, nicotine sulfate, sulfoxaflor, flupyradifurone, hydroprene, kinoprene, methoprene, pyriproxyfen, chlordane, benzoepin, flubendiamide, chlorantraniliprole, cyantraniliprole, thiocyclam, cartap, bensultap, thiosultap, chromafenozide, methoxyfenozide, halofenozide, tebufenozide, chlorfluazuron, trigard, amitraz, hydramethylnon, acequinocyl, fluacrypyrim, fenazaquin, fenpyroximate, pyrimidifen, pyridaben, tebufenpyrad, tolfenpyrad, derris extract, chlorfenapyr, DNOC, sulfluramid, emamectin, lepimectin, milbemectin, abamectin, spinosad, spinetoram, bistrifluron, diflubenzuron, flucycloxuron, hexaflumuron, lufenuron, novaluron, noviflumuron, teflubenzuron, triflumuron, buprofezin, cyromazine, pyrifluquinazon, fipronil, ethiprole, fenoxycarb, indoxacarb, metaflumizone, spirodiclofen, spiromesifen, spirotetramat, pymetrozine, flonicamid, chloropicrin, sulfuryl fluoride, clofentezine, hexythiazox, diflovidazin, etoxazole, diafenthiuron, azocyclotin, tricyclohexyltin hydroxide, fenbutatin oxide, propargite, tetradifon, silafluofen, aluminum phosphide, calcium phosphide, hydrogen phosphide, zinc phosphide, cyenopyrafen, cyflumetofen, azadirachtin, benzoximate, bifenazate, bromopropylate, quinomethionate, sodium aluminum fluoride, dicofol, pyridalyl, inorganic copper, organic copper, inorganic sulfur, polycarbamate, benalaxyl, furalaxyl, metalaxyl, oxadixyl, ofurace, bupirimate, dimethirimol, ethirimol, hydroxyisoxazole, octhilinone, oxolinic acid, benomyl, carbendazol, fuberidazole, thiabendazole, thiophanate, thiophanate-methyl, diethofencarb, zoxamide, ethaboxam, pencycuron, fluopicolide, diflumetorim, benodanil, flutolanil, mepronil, isofetamid, fluopyram, fenfuram, carboxin, oxycarboxin, thifluzamide, benzovindiflupyr, bixafen, fluxapyroxad, furametpyr, isopyrazam, penflufen, penthiopyrad, sedaxane, boscalid, azoxystrobin, coumoxystrobin, enoxastrobin, flufenoxystrobin, picoxystrobin, pyraoxystrobin, pyraclostrobin, pyrametostrobin, triclopyricarb, kresoxim-methyl, trifloxystrobin, dimoxystrobin, fenaminstrobin, metominostrobin, orysastrobin, famoxadone, fluoxastrobin, fenamidone, pyribencarb, cyazofamid, amisulbrom, binapacryl, meptyldinocap, dinocap, fluazinam, ferimzone, organotin, silthiofam, ametoctradin, cyprodinil, mepanipyrim, pyrimethanil, blasticidin S, kasugamycin, streptomycin, oxytetracycline, quinoxyfen, proquinazid, fenpiclonil, fludioxonil, chlozolinate, iprodione, procymidone, vinclozolin, edifenphos, iprobenfos, pyrazophos, isoprothiolane, biphenyl, chloroneb, dichloran, quintozene, tecnazene, tolclofos-methyl, echlomezol, iodocarb, propamocarb, prothiocarb, *Bacillus subtilis*, triforine, pyrifenox, pyrixazole, fenarimol, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, prothioconazole, aldimorph, dodemorph, fenpropimorph, tridemorph, fenpropidin, piperalin, spiroxamine, fenhexamid, fenpyrazamine, pyributicarb, naftifine, terbinafine, validamycin, polyoxin, dimethomorph, flumorph, pyrimorph, benthiavalicarb, iprovalicarb, valifenalate, mandipropamid, fthalide, pyroquilon, tricyclazole, carpropamid, diclocymet, fenoxanil, acibenzolar-S-methyl, probenazole, tiadinil, isotianil, laminarin, cymoxanil, fosetyl, tecloftalam, triazoxide, flusulfamide, diclomezine, methasulfocarb, cyflufenamid, metrafenone, pyriofenone, guanidine, flutianil, ferimzone, ferbam, manzeb, maneb, metiram, propineb, thiuram, zineb, captan, difolatan, folpet, TPN, dichlofluanid, tolylfluanid, guazatine, iminoctadine, triazine, dithianon, quinomethionate, fluoroimide, triflumezopyrim, and dicloromezotiaz.

Examples of the additives that can be used for the present invention include, but are not particularly limited to, saccharides, binders, inorganic salts, and mineral powder carriers. One of these may be used singly, or two or more of these can be used in combination.

Examples of the saccharides that can be used for the present invention include, but are not particularly limited to, lactose, fructose, glucose, maltose, starch, dextrin, sucrose, trehalose, and cellulose. One of these may be used singly, or two or more of these can be used in combination. As the saccharides, lactose and dextrin are preferred. The usage amount of these is preferably in a range from 0.1 to 50 parts by mass and more preferably in a range from 5 to 25 parts by mass, based on 100 parts by mass of the wettable agrochemical composition of the present invention. Particularly preferred examples of the saccharides include Hilmar 5030 Extra Fine Grind Lactose ((trade name), lactose, manufactured by Hilmar Ingredients) and PINE FLOW ((trade name), a starch derivative, manufactured by Matsutani Chemical Industry Co., Ltd.). According to a preferred embodiment of the present invention, the wettable agrochemical composition of the present invention includes saccharides.

Examples of the binder that can be used for the present invention include, but are not particularly limited to, polyvinyl alcohol, polyvinylpyrrolidone, methyl cellulose, carboxymethyl cellulose, and lignin salt. One of these may be used singly, or two or more of these can be used in combination. As the binder, polyvinylpyrrolidone and polyvinyl alcohol are preferred. The usage amount of these is preferably in a range from 0.1 to 20 parts by mass and more preferably in a range from 1 to 10 parts by mass, based on 100 parts by mass of the wettable agrochemical composition of the present invention. Particularly preferred examples of the binder include CREEJUS K-30 ((trade name), polyvinylpyrrolidone, manufactured by DKS Co., Ltd.), KURARAY POVAL ((trade name), polyvinyl alcohol, manufactured by KURARAY CO., LTD.), METOLOSE MCE-4 ((trade name), methyl cellulose, manufactured by Shin-Etsu Chemical Co., Ltd.), and CELLOGEN 7A ((trade name), carboxymethyl cellulose sodium, manufactured by Co., Ltd.).

Examples of the inorganic salt that can be used for the present invention include, but are not particularly limited to, potassium dihydrogen phosphate, potassium chloride, sodium chloride, ammonium sulfate, sodium carbonate, and mirabilite. One of these may be used singly, or two or more of these can be used in combination. As inorganic salt, potassium dihydrogen phosphate and potassium chloride are preferred. The usage amount of these is preferably in a range from 0.1 to 20 parts by mass and more preferably in a range from 1 to 10 parts by mass, based on 100 parts by mass of the wettable agrochemical composition of the present invention.

Examples of the mineral powder carrier that can be used for the present invention include, but are not particularly limited to, diatomaceous earth, acid clay, volcanic ash soil, talc, clay, calcium carbonate, bentonite, attapulgite, sepiolite, zeolite, and calcium silicate. One of these may be used singly, or two or more of these can be used in combination. As the mineral powder carrier, diatomaceous earth, acid clay, and volcanic ash soil are preferred. The usage amount of these is preferably in a range from 0 to 70 parts by mass and more preferably in a range from 0 to 50 parts by mass, based on 100 parts by mass of the wettable agrochemical composition of the present invention. Particularly preferred examples of the mineral powder carrier include MAARLITE 735C ((trade name), white clay, manufactured by Marunakahakudo Inc.), RADIOLITE F ((trade name), diatomaceous earth, manufactured by Showa Chemical Industry Co., LTD.), RADIOLITE 200 ((trade name), diatomaceous earth, manufactured by Showa Chemical Industry Co., LTD.), and TOPCO PERLITE ((trade name), volcanic ash soil, manufactured by Showa Chemical Industry Co., LTD.).

Examples of the surfactant to be used for the present invention are not particularly limited. Preferred examples include polyoxyethylenealkylether sulfate, polyoxyethylated castor oil, polyoxyethylenetristyryl ether phosphate, alkylnaphthalenesulfonate-formaldehyde condensate, dioctyl sulfosuccinate, and polycarboxylic acid. One of these may be used singly or two or more of these may be used in admixture. The mixing ratio can be freely selected. The content of the surfactant in the wettable agrochemical composition of the present invention is not particularly limited, and is preferably in the range from 0.1 to 20 parts by mass and particularly preferably in the range from 1.0 to 10.0 parts by mass, based on 100 parts by mass of the wettable agrochemical composition of the present invention. Particularly preferred examples of the surfactant include SORPOL 7868 ((trade name), TOHO Chemical Industry Co., Ltd.), MORWET D-425 powder ((trade name), Lion Akzo Co., Ltd.), NEWKALOEN WG-5 ((trade name), TAKEMOTO OIL & FAT Co., Ltd.), and SORPOL 5050 ((trade name), TOHO Chemical Industry Co., Ltd.).

In one embodiment of the present invention, as for the blend proportion of the agrochemical effective components and other components, for example, the proportion of a agrochemical effective component (A) is 1 to 30 parts by mass and preferably 5 to 20 parts by mass, the proportion of a agrochemical active component (B) is 0 to 50 parts by mass and preferably 0 to 25 parts by mass, and the proportion of other components is 20 to 99 parts by mass and preferably 55 to 95 parts by mass, based on 100 parts by mass in total of the agrochemical effective components and other components.

The wettable agrochemical composition of the present invention can be produced by, for example, a method including a step of wet-pulverizing the agrochemical active component (A) or a mixture of the agrochemical active component (A) and the agrochemical active component (B) along with a surfactant. More specifically, for example, the agrochemical active component (A) or a combination of the agrochemical active component (A) and the agrochemical active component (B) is added and mixed in water in which the surfactant has been dissolved, and the mixture is subjected to atomization to a desired particle diameter by a wet pulverizer such as a batch-type bead mill or Dyno-mill to provide slurry. To this slurry, additives or a combination of the additives and the agrochemical active component (B) can be added and mixed to produce the wettable agrochemical composition of the present invention. Thereafter, in order to provide a dosage form as a wettable powder, the composition can be formulated by drying, dry pulverization, and sieving and the like to a required particle size, or by, after granulation, drying and then pulverization. In order to provide a dosage form as a granular wettable powder, the composition can be formulated by hydrating and kneading, as required, and granulating in a granulator to produce a granulated product having a diameter of 0.5 to 1.0 mm, then drying and sieving to a required particle size, or adding the additives and the agrochemical active component (A) or the agrochemical active component (B) to a slurry atomized in the same manner, mixing, and spray-drying by using a spray drier or the like.

A method of wet pulverization in a manufacturing process of the present invention is not particularly limited, and methods known as common wet pulverization methods are applied. Examples of such methods include a method of pulverizing the agrochemical active component (A) or a combination of the agrochemical active component (A) and the agrochemical active component (B) along with water and a surfactant. Generally, the agrochemical active component in wet-pulverized slurry is pulverized to around 0.5 to 5 μm.

To such wet-pulverized slurry, known additives such as a thickener, an antifreezing agent, a preservative, an antifoam agent, and a crystal growth inhibitor may be appropriately blended, as required. Examples of the thickener include natural polysaccharides such as xanthan gum and locust beam, bentonites such as magnesium aluminum silicate, and semisynthetic polysaccharides such as carboxymethyl cellulose. Examples of the antifreezing agent include urea or glycols such as propylene glycol and ethylene glycol. Examples of the preservative include 1,2-benzisothiazolin-3-one and 2-methyl-isothiazolin-3-one. Examples of the antifoaming agent include silicone-based emulsions.

Examples of pulverizers that can be used in the present invention, for dry pulverization, include a coffee mill, a hammer mill, a NEA mill, a pin mill, a power mill, and a jet mill. A pulverizer to be used can be selected depending on the nature of a material to be pulverized and the purpose. Examples of pulverizers for wet pulverization include a pulverizers such as a batch-type bead mill and a Dyno-mill, and examples of the beads to be used include glass beads and zirconia beads. A bead particle diameter for use is preferably in the range from 0.3 to 1.0 mm, and are more preferably in the range from 0.5 to 0.7 mm. A pulverization liquid having a small volume median diameter can be prepared by use of beads having a small particle diameter.

According to a preferred embodiment of the present invention, in the wettable agrochemical composition of the present invention, the agrochemical active component (A) or a mixture of the agrochemical active component (A) and the agrochemical active component (B) is in a form of a wet-pulverized product obtained by wet pulverization along with a surfactant. The volume median diameter of the agrochemical active component (A) or the agrochemical active component (A) and the agrochemical active component (B) in a suspension liquid obtained upon wet pulverization is supposed to be from 0.1 to 5.0 μm. Agrochemical active components having such a volume median diameter are preferred for enhancing the controlling effect on pests.

In the present invention, the "volume median diameter" refers to an average particle diameter in terms of volume, referring to a particle diameter at which a cumulative curve indicates 50% when the cumulative curve is obtained by taking the total volume of a group thereof as 100%. The volume median diameter of the agrochemical active component particles in the wettable agrochemical composition of the present invention can be determined by measuring the size and distribution state of the volume median diameter using a commercially available laser diffraction particle size distribution analyzer, for example, SALD2200 (manufactured by SHIMADZU CORPORATION) or the like.

In the manufacturing process of the present invention, in order to adjust agrochemical active component particles to an intended volume median diameter, the type and concentration of the surfactant and the pulverization conditions under which the active component is dispersed (bead particle diameter, pulverizer type, stirring speed, liquid feeding speed, and the like) play an important role. The particle diameter of the active component is substantially determined by a step of preparing the pulverization conditions and a dispersion system. Thus, it is important in this step to select a surfactant and a pulverization method in accordance with the particle design for the active component.

In the manufacturing process of the present invention, mixing of the agrochemical active component and additives can be performed by physical mixing. In the mixing step, mechanical stirring and mixing are suitably performed, and keeping the conditions constant enables homogeneous mixing. For stirring, a blade, a propeller, a turbine, or the like can be used. For mixing, a kneader, a ribbon mixer, a V-shape mixer, a double cone mixer, a Spartan mixer, a pug mixer, tumbler mixer, or the like can be used.

A granulation method in the manufacturing process in the present invention is not particularly limited. Standard methods such as an extruding granulation method, an agitation granulation method, a rolling granulation method, a pressurization granulation method, and fluidized bed granulation method can be used. Among these, the extruding granulation method is desirably performed. The extruding granulation method is a method in which the mixture is kneaded and forced to pass through perforations of a predetermined size to shape grains, and the grains are cut to a predetermined size as required, dried, and sieved. Examples of the granulator that can be used include thin multi-hole metal plates, Multigran (manufactured by DALTON Corporation), and a basket extruder (manufactured by DALTON Corporation), The diameter of the perforations is around from 0.1 mm to 2 mm and preferably from 0.3 mm to 1 mm.

The drying method in the manufacturing process of the present invention is not particularly limited. In the case of a small amount of 20 g or less, a constant-temperature oven is preferred, and in the case of 20 g or more, a fluidized bed drier or the like is preferred. The drying temperature is preferably from 40° C. to 60° C., and the drying time is preferably around from 15 minutes to 2 hours.

The wettable agrochemical composition of the present invention is excellent in disintegratability and dispersibility, having good physical properties of the formulation even after an extended storage period. The production method of the present invention enables active components including flometoquin to convert to a granular wettable powder while keeping their volume median diameter small, and thus enables mixing of agrochemical active components that has been difficult to perform in liquid formulations due to problems of their stability and physicochemical properties such as dissolution or decomposition, recrystallization, crystal growth, aggregation, and hardcaking, which may occur by mixing in liquid formulations. Consequently, the present invention is extremely useful.

EXAMPLES

Hereinbelow, the present invention will be further described in detail referring to Examples, while the present invention is not intended to be limited to these Examples.

Measurement of Volume Median Diameter of Agrochemical Active Component Particles The volume median diameter of the agrochemical active component particles in formulations of Examples and Comparative Examples was measured using the following analysis apparatus and analysis conditions.

Analysis apparatus: laser diffraction particle size distribution analyzer SALD-2200, (manufactured by SHIMADZU CORPORATION)
Measurement mode: laser diffraction and laser scattering methods
Measurement range: 0.03 to 1000 μm
Light source: semiconductor laser (wavelength 680 nm, output 3 mW)
Cell: flow cell mode
Cell material: made of quartz glass
Software: Wing SALD-2200
Analysis sample: As a volume median diameter measurement method, 500 mg of a flowable agent was dispersed in 50 mL of water, and the dispersion liquid was subjected to the measurement with the particle size distribution analyzer. In the case of a granular wettable powder, 200 mg was dispersed in 10 mL of water. In order to remove coarse particles such as a carrier, the carrier was settled by natural settlement, centrifuge, or the like. Then, the supernatant was measured by the particle size distribution analyzer.

Preparation of Flometoquin Pulverization Liquid (A)

In a 100-mL flask, 0.5 parts by mass of SORPOL 5050 ((trade name), sodium dioctyl sulfosuccinate, manufactured by TOHO Chemical Industry Co., Ltd.), 3 parts by mass of SORPOL 7868 ((trade name), polyoxyethylene alkylether sulfate, manufactured by TOHO Chemical Industry Co., Ltd.), 3 parts by mass of MORWET D-425 powder ((trade name), alkylnaphthalenesulfonate-formaldehyde condensate, manufactured by Lion Akzo Co., Ltd), 0.25 parts by mass of Antifoam E-20 ((trade name), silicone-based antifoaming agent, manufactured by Kao Corporation), and 10 parts by mass of a flometoquin technical product (99.0%) were added to 15.2 parts by mass of water, and the components were mixed and stirred. The resulting mixture was wet-pulverized in a batch-type bead mill to prepare a flometoquin pulverization liquid (A). The particle size was measured by the laser diffraction particle size distribution analyzer to obtain the volume median diameter of 1.0 μm.

Preparation of Flometoquin Pulverization Liquid (B)

In a 100-mL flask, 0.5 parts by mass of SORPOL 5050 ((trade name), sodium dioctyl sulfosuccinate, manufactured by TOHO Chemical Industry Co., Ltd.), 3 parts by mass of SORPOL 7868 ((trade name), polyoxyethylene alkylether sulfate, manufactured by TOHO Chemical Industry Co., Ltd.), 3 parts by mass of MORWET D-425 powder ((trade name), alkylnaphthalenesulfonate-formaldehyde condensate, manufactured by Lion Akzo Co., Ltd.), 0.25 parts by mass of Antifoam E-20 ((trade name), silicone-based antifoaming agent, manufactured by Kao Corporation), 10.5 parts by mass of a flometoquin technical product (99.0%), and 10.4 parts by mass of an imidacloprid technical product (98.7%) were added to 42.5 parts by mass of water, and the components were mixed and stirred. The resulting mixture was wet-pulverized in a batch-type bead mill to prepare a flometoquin-imidacloprid mixed pulverization liquid (B). The particle size was measured by the laser diffraction particle size distribution analyzer to obtain the volume median diameter of 1.4 μm.

Preparation of Thickener Liquid 28.6 parts by mass of propylene glycol, 0.6 parts by mass of RHODOPOL 23 ((trade name), xanthan gum, manufactured by Solvay Nicca, Ltd.), 1 part by mass of KUNIPIA F ((trade name), bentonite, manufactured by Kunimine Industries Co, Ltd.), 0.9 parts by mass of PROXEL GXL(S) ((trade name), fungicide, manufactured by Lonza Japan Ltd.), and 53.6 parts by mass of water were mixed to prepare a thickener liquid.

Example 1

6 parts by mass of RADIOLITE F ((trade name), diatomaceous earth, manufactured by Showa Chemical Industry Co., LTD.), 1 part by mass of NEWKALGEN WG-5 ((trade name), sodium polycarboxylate, manufactured by TAKEMOTO OIL & FAT Co, Ltd.), 2 parts by mass of Hilmar 5030 Extra Fine Grind Lactose ((trade name), lactose, manufactured by Hilmar Ingredients), and 1 part by mass of potassium dihydrogen phosphate (Wako Pure Chemical Industries, Ltd.) were mixed. To the mixture pulverized with a coffee mill, 4 parts by mass of the flometoquin pulverization liquid (A) and water as appropriate were added and kneaded, and the kneaded product was forced to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a 10% flometoquin granular wettable powder. The particle size was measured by the laser diffraction particle size distribution analyzer to obtain the volume median diameter of 1.0 μm.

Example 2

Preparation was performed, until addition of 4 parts by mass of the pulverization liquid (A), exactly in the same manner as in Example 1. After kneading, the kneaded product was dried in a constant-temperature oven at 50° C. for 2 hours and pulverized again with the coffee mill to obtain a 10% flometoquin wettable powder.

Example 3

Production was carried out exactly in the same manner as in Example 1 except that RADIOLITE F was replaced by MAARLITE 735C ((trade name), acidic clay, manufactured by Marunakahakudo Inc.) to obtain a 10% flometoquin granular wettable powder Example 4

Production was carried out exactly in the same manner as in Example 1 except that RADIOLITE F was replaced by TOPCO PERLITE ((trade name), foamed perlite, manufactured by Showa Chemical Industry Co., LTD.) to obtain a 10% flometoquin granular wettable powder.

Example 5

Production was carried out exactly in the same manner as in Example 1 except that 1 part by mass potassium dihydrogen phosphate (Wako Pure Chemical Industries, Ltd.) was replaced by 1 part by mass of potassium chloride (Wako Pure Chemical Industries, Ltd.) to obtain a 10% flometoquin granular wettable powder.

Example 6

Production was carried out exactly in the same manner as in Example 1 except that the amount of RADIOLITE F ((trade name), diatomaceous earth, manufactured by Showa Chemical Industry Co., LTD.) was changed from 6 parts by mass to 4 parts by mass, the amount of Hilmar 5030 Extra Fine Grind Lactose ((trade name), lactose, manufactured by Hilmar Ingredients) was changed from 2 parts by mass to 1 part by mass, the amount of NEWKALGEN WG-5 ((trade name), sodium polycarboxylate, manufactured by TAKEMOTO OIL & FAT Co., Ltd.) was changed from 1 part by mass to 0.5 parts by mass, and the amount of potassium dihydrogen phosphate (Wako Pure Chemical Industries, Ltd.) was changed from 1 part by mass to 0.5 parts by mass to obtain a 15% flometoquin granular wettable powder.

Example 7

29 parts by mass of RADIOLITE F ((trade name), diatomaceous earth, manufactured by Showa Chemical Industry Co., LTD.), 2.5 parts by mass of NEWKALGEN WG-5 ((trade name), sodium polycarboxylate, manufactured by TAKEMOTO OIL & FAT Co., Ltd), 5 parts by mass of Hilmar 5030 Extra Fine Grind Lactose ((trade name), lactose, manufactured by Hilmar Ingredients), 1 part by mass of potassium dihydrogen phosphate (Wako Pure Chemical Industries, Ltd.), and 1 part by mass of CREEJUS K-30 ((trade name), polyvinylpyrrolidone, manufactured by DKS Co, Ltd,) were mixed and pulverized by a hammer mill. To the mixture, 30 parts by mass of the flometoquin pulverization liquid (A) were added and kneaded, and the kneaded product was dried in a constant-temperature oven at 50° C. for 2 hours. Then, to the resulting powder, 10 parts by mass of the flometoquin pulverization liquid (A) was further added and kneaded, and water as appropriate was added thereto. Thereafter, the kneaded product was made to pass through a screen of φ0.5 mm in a Multigran MG-55 (trade name, granulator, manufactured by DALTON Corporation) and granulated into columnar granulates. The resulting columnar granulates were dried using a fluidized bed dryer at 50° C. for 30 minutes, and then made to pass through a sieve having an opening of 1 mm for size regulation to obtain a 20% flometoquin granular wettable powder.

Example 8

Production was carried out exactly in the same manner as Example 7 except that 1 part by mass of CREEJUS K-30 ((trade name), polyvinylpyrrolidone, manufactured by DKS Co., Ltd.) was replaced by 1 part by mass of PINE FLOW ((trade name), a starch derivative, manufactured by Matsutani Chemical Industry Co., Ltd.) to obtain a 20% flometoquin granular wettable powder.

Example 9

5.6 parts by mass of RADIOLITE F ((trade name), diatomaceous earth, manufactured by Showa Chemical Industry Co., LTD.), 1.2 parts by mass of imidacloprid (purity 98.7%), 1 part by mass of NEWKALGEN WG-5 ((trade name), sodium polycarboxylate, manufactured by TAKEMOTO OIL & FAT Co, Ltd.), 2 parts by mass of Hilmar 5030 Extra Fine Grind Lactose ((trade name), lactose, manufactured by Hilmar Ingredients), and 0.2 parts by mass of CREEJUS K-30 ((trade name), polyvinylpyrrolidone, manufactured by DKS Co., Ltd.) were mixed. To the mixture pulverized with a coffee mill, 4 parts by mass of the flometoquin pulverization liquid (A) and water as appropriate were added and kneaded, and the kneaded product was made to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a mixed granular wettable powder of 10% flometoquin and 10% imidacloprid. The particle size was measured by the laser diffraction particle size distribution analyzer to obtain the volume median diameter of 1.3 µm.

Example 10

Preparation was performed, until addition of the flometoquin pulverization liquid (A), exactly in the same manner as in Example 9. After drying in a constant-temperature oven at 50° C. for 2 hours, the mixture was pulverized with a coffee mill to obtain a mixed wettable powder of 10% flometoquin and 10% imidacloprid, Example 11

4.4 parts by mass of RADIOLITE F ((trade name), diatomaceous earth, manufactured by Showa Chemical Industry Co., LTD.), 1 part by mass of NEWKALGEN WG-5 ((trade name), sodium polycarboxylate, manufactured by TAKEMOTO OIL & FAT Co., Ltd.), 2 parts by mass of Hilmar 5030 Extra Fine Grind Lactose ((trade name), lactose, manufactured by Hilmar Ingredients), 0.5 parts by mass of potassium dihydrogen phosphate (Wako Pure Chemical Industries, Ltd.), and 0.2 parts by mass of CREEJUS K-30 ((trade name), polyvinylpyrrolidone, manufactured by DKS Co., Ltd.) were mixed. To the mixture pulverized with a coffee mill, 8 parts by mass of the pulverization liquid (B) and water as appropriate were added and kneaded, and the kneaded product was made to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a mixed granular wettable powder of 8% flometoquin and 8% imidacloprid. The particle size was measured by the laser diffraction particle size distribution analyzer to obtain the volume median diameter of 1.5 µm.

Example 12

Preparation was performed, until addition of the pulverization liquid (B), exactly in the same manner as in Example 11. After drying in a constant-temperature oven at 50° C. for 2 hours, the mixture was pulverized with a coffee mill to obtain a mixed wettable powder of 8% flometoquin and 8% imidacloprid.

Example 13

37 parts by mass of RADIOLITE F ((trade name), diatomaceous earth, manufactured by Showa Chemical Industry Co., LTD.), 1.5 part by mass of NEWKALGEN WG-5 ((trade name), sodium polycarboxylate, manufactured by TAKEMOTO OIL & FAT Co., Ltd.), 3 parts by mass of Hilmar 5030 Extra Fine Grind Lactose ((trade name), lactose, manufactured by Hilmar Ingredients), 1 part by mass of potassium dihydrogen phosphate (Wako Pure Chemical Industries, Ltd.), and 0.2 parts by mass of CREEJUS K-30 ((trade name), polyvinylpyrrolidone, manufactured by DKS Co., Ltd.), and 0.6 parts by mass of chromafenozide technical product (purity 95.0%) were mixed. To the mixture pulverized with a coffee mill, 4 parts by mass of the pulverization liquid (A) and water as appropriate were added and kneaded, and the kneaded product was made to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a mixed granular wettable powder of 10% flometoquin and 5% chromafenozide. The particle size was measured by the laser diffraction particle size distribution analyzer to obtain the volume median diameter of 1.0 μm.

Example 14

Preparation was performed, until addition of the pulverization liquid (A), exactly in the same manner as in Example 13. After drying in a constant-temperature oven at 50° C. for 2 hours, the mixture was pulverized with a coffee mill to thereby obtain a mixed wettable powder of 10% flometoquin and 5% chromafenozide, Example 15

6 parts by mass of RADIOLITE F ((trade name), diatomaceous earth, manufactured by Showa Chemical Industry Co., LTD.), 1.0 part by mass of NEWKALGEN WG-5 ((trade name), sodium polycarboxylate, manufactured by TAKEMOTO OIL & FAT Co., Ltd), 2 parts by mass of Hilmar 5030 Extra Fine Grind Lactose ((trade name), lactose, manufactured by Hilmar Ingredients), and 0.2 parts by mass of CREEJUS K-30 ((trade name), polyvinylpyrrolidone, manufactured by DKS Co., Ltd,) were mixed, To the mixture pulverized with a coffee mill, a mixed liquid of 2 parts by mass of the pulverization liquid (A) and 3 parts by mass of Shotgun ((trade name), diazinon EW formulation, manufactured by Nippon Kayaku Co., Ltd.) and water as appropriate were added and kneaded, and the kneaded product was made to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a mixed granular wettable powder of 5% flometoquin and 10% diazinon. When the particle size was measured by the laser diffraction particle size distribution analyzer, the volume median diameter was 2.9 μm.

Example 16

Preparation was performed, until addition of the pulverization liquid (A) and Shotgun, exactly in the same manner as in Example 15. After drying in a constant-temperature oven at 50° C. for 2 hours, the mixture was pulverized with a coffee mill to obtain a mixed wettable powder of 5% flometoquin and 10% diazinon.

Example 17

Preparation was performed exactly in the same manner as Example 15 except that the amount of RADIOLITE F ((trade name), diatomaceous earth, manufactured by Showa Chemical Industry Co., LTD.) was changed from 6 parts by mass to 4.6 parts by mass and 3 parts by mass of Shotgun ((trade name), diazinon EW formulation, manufactured by Nippon Kayaku Co., Ltd.) were replaced by 3.2 parts by mass of diazinon technical product (purity 95.4%) to prepare a mixed granular wettable powder of 5% flometoquin and 25% diaznon. The particle size was measured by the laser diffraction particle size distribution analyzer to obtain the volume median diameter of 3.1 μm.

Example 18

Preparation was performed, until addition of the pulverization liquid (A) and the diazinon technical product, exactly in the same manner as in Example 17. After drying in a constant-temperature oven at 50° C. for 2 hours, the mixture was pulverized with a coffee mill to obtain a mixed wettable powder of 5% flometoquin and 25% diazinon.

Example 19

Preparation was performed exactly in the same manner as Example 15 except that the amount of RADIOLITE F ((trade name), diatomaceous earth, manufactured by Showa Chemical Industry Co., LTD.) was changed from 6 parts by mass to 5.8 parts by mass and 3 parts by mass of Shotgun ((trade name), diazinon EW formulation, manufactured by Nippon Kayaku Co., Ltd.) were replaced by 4 parts by mass of BELLKUTE Flowable ((trade name), iminoctadine albesilate (labelled value 30%), manufactured by Nippon Soda Co., Ltd.) to obtain a mixed granular wettable powder of 5% flometoquin and 10% iminoctadine albesilate. The particle size was measured by the laser diffraction particle size distribution analyzer to obtain the volume median diameter of 1.7 μm.

Example 20

Preparation was performed, until addition of the pulverization liquid (A) and BELLKUTE Flowable, exactly in the same manner as in Example 19. After drying in a constant-temperature oven at 50° C. for 2 hours, the mixture was pulverized with a coffee mill to obtain a mixed wettable powder of 5% flometoquin and 10% iminoctadine albesilate.

Example 21

Preparation was performed exactly in the same manner as Example 15 except that the amount of RADIOLITE F ((trade name), diatomaceous earth, manufactured by Showa Chemical Industry Co., LTD,) was changed from 6 parts by mass to 5.8 parts by mass and 3 parts by mass of Shotgun ((trade name), diazinon EW formulation, manufactured by Nippon Kayaku Co., Ltd.) were replaced by 4 parts by mass of Larvin Flowable ((trade name), thiodicarb (labelled value 33.5%), manufactured by Bayer CropScience Ltd,) to obtain a mixed granular wettable powder of 5% flometoquin and 11% thiodicarb. The particle size was measured by the laser diffraction particle size distribution analyzer to obtain the volume median diameter of 1.5 μm.

Example 22

Preparation was performed, until addition of the pulverization liquid (A) and Larvin Flowable, exactly in the same manner as in Example 21. After drying in a constant-temperature oven at 50° C. for 2 hours, the mixture was pulverized with a coffee mill to obtain a mixed wettable powder of 5% flometoquin and 11% thiodicarb.

Comparative Example 1

In a 1-L flask, 5 parts by mass of SORPOL 5050 ((trade name), sodium dioctyl sulfosuccinate, TOHO Chemical Industry Co., Ltd.), 30 parts by mass of SORPOL 7868 ((trade name), polyoxyethylene alkylether sulfate, TOHO Chemical Industry Co, Ltd.), 30 parts by mass of MORWET D-425 powder ((trade name), alkylnaphthalenesulfonate-formaldehyde condensate, manufactured by Lion Akzo Co., Ltd.)), 2.5 parts by mass of Antifoam E-20 ((trade name), silicone-based antifoaming agent, manufactured by Kao Corporation), and 100 parts by mass of flometoquin technical product (99.0%) were added to 152 parts by mass of water, and the components were mixed and stirred. The resulting mixture was wet-pulverized in a batch-type bead mill to prepare a pulverization liquid of flometoquin. To 100 parts by mass of this pulverization liquid, 101.3 parts by mass of water and 84.7 parts by mass of a thickener liquid were added and mixed to obtain a flowable formulation of 10% flometoquin. The particle size was measured by the laser diffraction particle size distribution analyzer to obtain the volume median diameter of 0.8 μm.

Comparative Example 2

29.6 parts by mass of a thickener was added and mixed to 70.4 parts by mass of the pulverization liquid (B) to obtain a mixed flowable formulation of 10% flometoquin and 10% imidacloprid. The particle size was measured by the laser diffraction particle size distribution analyzer to obtain the volume median diameter of 1.4 μm.

Comparative Example 3

In a 100-mL flask, 0.5 parts by mass of SORPOL 5050 ((trade name), sodium dioctyl sulfosuccinate, manufactured by TOHO Chemical Industry Co., Ltd.), 3 parts by mass of SORPOL 7868 ((trade name), polyoxyethylene alkylether sulfate, manufactured by TOHO Chemical Industry Co., Ltd.), 3 parts by mass of MORWET D-425 powder ((trade name), alkylnaphthalenesulfonate-formaldehyde condensate, manufactured by Lion Akzo Co., Ltd.), 0.25 parts by mass of Antifoam E-20 ((trade name), silicone-based antifoaming agent, manufactured by Kao Corporation), 10.5 parts by mass of a flometoquin technical product (99.0%), and 29.0 parts by mass of a thiocyclam technical product (87.0%) were added to 24.2 parts by mass of water, and the components were mixed and stirred. The resulting mixture was wet-pulverized in a batch-type bead mill to prepare a mixed pulverization liquid of flometoquin and thiocyclam. 29.6 parts by mass of a thickener was added and mixed to 70.4 parts by mass of the pulverization liquid obtained to obtain a mixed flowable formulation of 10% flometoquin and 25% thiocyclam. The particle size was measured by the laser diffraction particle size distribution analyzer to obtain the volume median diameter of 2.5 μm.

Comparative Examples 4 to 32

As shown in Table 1, the 10% flometoquin flowable obtained in Comparative Example 1 and a common commercially available agent were mixed at a weight ratio of 1:1 to obtain a flometoquin mixed flowable formulation. The particle size of the prepared mixed flowable formulation was measured by a laser diffraction particle size distribution analyzer.

TABLE 1

Summary of Comparative Example 1 and 4 to 32

| C-Ex | Commercially available agent to be mixed with C-Ex 1 | Active agent and its content in C-Ex | Volume median diameter in C-Ex | Physical Property of C-Ex |
|---|---|---|---|---|
| 1 | — | flometoquin (10%) | 0.8 μm | suspension |
| 4 | Axel flowable | flometoquin (5%) metaflumizone (12.5%) | 1.0 μm | suspension |
| 5 | Affet flowable | flometoquin (5%) penthiopyrad (10%) | 2.6 μm | suspension |
| 6 | APPLAUD ACE flowable | flometoquin (5%) fenpyroximate (2%) buprofezin (10%) | 2.6 μm | suspension |
| 7 | Amistar Opti flowable | flometoquin (5%) Azoxystrobin (2.6%) TPN (20%) | 0.9 μm | suspension |
| 8 | Sulfur flowable | flometoquin (5%) sulfur (26%) | 0.9 μm | suspension |
| 9 | ONLYONE flowable | flometoquin (5%) tebuconazole (10%) | 2.1 μm | suspension |
| 10 | Kanemite flowable | flometoquin (5%) acequinocyl (7.5%) | 1.2 μm | suspension |
| 11 | Kotetsu flowable | flometoquin (5%) chlorfenapyr (5%) | 1.3 μm | suspension |
| 12 | Shotgun | flometoquin (5%) diazinon (20%) | 0.5 μm | suspension |
| 13 | Starmite flowable | flometoquin (5%) cyenopyrafen (15%) | 1.2 μm | suspension |
| 14 | Savior flowable 20 | flometoquin (5%) fludioxonil (10%) | 1.7 μm | suspension |
| 15 | Danitron flowable | flometoquin (5%) fenpyroximate (2.5%) | 1.4 μm | suspension |
| 16 | Danisaraba flowable | flometoquin (5%) cyflumetofen (10%) | 2.3 μm | suspension |
| 17 | Tornado flowable | flometoquin (5%) indoxacarb MP (5%) | 1.0 μm | suspension |
| 18 | Trebon Star flowable | flometoquin (5%) dinotefuran (1.5%) etofenprox (3.5%) | 25.1 μm | suspension |
| 19 | Hachi-Hachi flowable | flometoquin (5%) tolfenpyrad (7.5%) | 0.8 μm | suspension |
| 20 | Baroque flowable | flometoquin (5%) etoxazole (5%) | 2.2 μm | suspension |
| 21 | Prince flowable | flometoquin (5%) fipronil (2.5%) | 2.4 μm | suspension |
| 22 | Prebason flowable | flometoquin (5%) chlorantraniliprole (2.5%) | 1.3 μm | suspension |
| 23 | Frowncide SC | flometoquin (5%) fluazinam (19.8%) | 1.5 μm | suspension |
| 24 | Folio Gold | flometoquin (5%) metalaxyl M (1.7%) TPN (16%) | 1.2 μm | suspension |
| 25 | Falcon flowable | flometoquin (5%) methoxyfenozide (10%) | 1.7 μm | suspension |
| 26 | Bellkute flowable | flometoquin (5%) iminoctadine albesilate (15%) | 2.8 μm | suspension |
| 27 | Mito-Kohne flowable | flometoquin (5%) bifenazate (10%) | 1.0 μm | suspension |
| 28 | Matric flowable | flometoquin (5%) chromafenozide (2.5%) | 1.1 μm | suspension |
| 29 | Moncut flowable | flometoquin (5%) flutolanil (20%) | 2.7 μm | suspension |
| 30 | Larvin flowable | flometoquin (5%) thiodicarb (16.8%) | 1.7 μm | suspension |
| 31 | Rabcide Starkle flowable | flometoquin (5%) dinotefuran (1.5%) fthalide (6%) | 2.5 μm | suspension |
| 32 | Rizolex Befran flowable | flometoquin (5%) iminoctadine acetate (7.5%) triclofos methyl (12.5%) | 9.8 μm | suspension |

C-Ex: Comparative Example

Test Group 33

Production was carried out exactly in the same manner as in Example 1 except that the amount of WG-5 ((trade name), sodium polycarboxylate, manufactured by TAKEMOTO OIL & FAT Co., Ltd.) was changed from 1 part by mass to 1.5 parts by mass, the amount of Hilmar 5030 Extra Fine Grind Lactose ((trade name), lactose, manufactured by Hilmar Ingredients) was changed from 2 parts by mass to 0 part by mass, 6 parts by mass of RADIOLITE F ((trade name), diatomaceous earth, manufactured by Showa Chemical Industry Co., LTD.) were replaced by 2.5 parts by mass of anhydrous sodium sulfate (Wako Pure Chemical Industries, Ltd.), 1 part by mass of potassium dihydrogen phosphate (Wako Pure Chemical Industries, Ltd.) was replaced by 5 parts by mass of sodium dihydrogen phosphate (Wako Pure Chemical Industries, Ltd.), and the amount of the pulverization liquid (A) was changed from 4 parts by mass to 8.2 parts by mass to obtain a 19% flometoquin granular wettable powder.

Test Group 34

Production was carried out exactly in the same manner as in Example 1 except that 6 parts by mass of RADIOLITE F ((trade name), diatomaceous earth, manufactured by Showa Chemical Industry Co., LTD,) were replaced by 2.2 parts by mass of anhydrous sodium sulfate (Wako Pure Chemical Industries, Ltd.), the amount of Hilmar 5030 Extra Fine Grind Lactose ((trade name), lactose, manufactured by Hilmar Ingredients) was changed from 2 parts by mass to 0 parts by mass, 1 part by mass of potassium dihydrogen phosphate (Wako Pure Chemical Industries, Ltd.) was replaced by 4 parts by mass of sodium dihydrogen phosphate (Wako Pure Chemical Industries, Ltd,), and the amount of the pulverization liquid (A) was changed from 4 parts by mass to 8.2 parts by mass, and furthermore, 1.3 parts by mass of SAN X P252 ((trade name), lignin, manufactured by Nippon Paper Industries Co., Ltd.) were added to obtain a 20% flometoquin granular wettable powder.

Test Group 35

6 parts by mass of clay for wettable powder, 2 parts by mass of Carplex #80 ((trade name), white carbon, Evonik Japan Co., Ltd.), and 2 parts by mass of SAN X P-252 ((trade name), lignin salt, manufactured by Nippon Paper Industries Co., Ltd.) were mixed. To the mixture pulverized with a coffee mill, 4 parts by mass of the pulverization liquid (A) and water as appropriate were added and kneaded, and the kneaded product was forced to pass through a 0.5-mm multi-hole plate and granulated into a columnar form. The resulting columnar granulates were dried in a constant-temperature oven at 50° C. for 2 hours, and then made to pass through a sieve having an opening of 1 mm for size regulation to obtain a 10% flometoquin granular wettable powder.

Test Group 36

Production was carried out exactly in the same manner as in Test group 35 except that the amount of the clay for wettable powder was changed from 6 parts by mass to 4.7 parts by mass and furthermore, 1.3 parts by mass of an imidacloprid technical product (purity 98.7%) was newly added to obtain a mixed granular wettable powder of 10% flometoquin and 10% imidacloprid.

Test Example 1: Changes in Physical Property of Formulation after Stability Test at 54° C. for 2 Weeks Each of the formulations produced in Examples 1, 7, 9, 11, 13, 15, 17, 19, 21, 23, and 25 and Comparative Examples 1 to 32 was enclosed in a capped 10-mL glass bottle and stored in a constant-temperature oven at 54° C. for 14 days. Each of the formulations after storage was left at room temperature for several days, and the change in the appearance was visually checked. In some of the samples, the change in the volume median diameter was evaluated using the crystal growth rate.

As a volume median diameter measurement method, 500 mg of the flowable agent of each Comparative Example was dispersed in 50 mL of water, and the dispersion liquid was measured with a particle size distribution analyzer. 200 mg of the granular wettable powder of each Example was dispersed in 10 mL of water. In order to remove coarse particles such as a carrier, the carrier was subjected to natural settlement for 30 to 60 minutes, and then, the supernatant was measured by a particle size distribution analyzer, The results are shown in Table 2 below.

TABLE 2

Comparison of Appearance and Crystal Growth Rate of Formulations

| | Example | | | | | | |
|---|---|---|---|---|---|---|---|
| | 1 | 7 | 9 | 11 | 13 | 15 | 17 |
| Appearance | ○ | ○ | ○ | ○ | ○ | ○ | ○ |
| Crystal growth rate (%) | | | 100 | 100 | 100 | 100 | 100 |

| | Example | |
|---|---|---|
| | 19 | 21 |
| Appearance | ○ | ○ |
| Crystal growth rate (%) | | |

| | Comparative Example | | | | | | |
|---|---|---|---|---|---|---|---|
| | 1 | 2 | 3 | 4 | 5 | 8 | 9 |
| Appearance | ○ | ○ | x | Δ | Δ | Δ | ○ |
| Crystal growth rate (%) | 136 | 118 | 238 | 118 | 115 | 86 | 132 |

| | Comparative Example | | | | | | |
|---|---|---|---|---|---|---|---|
| | 10 | 11 | 12 | 13 | 14 | 17 | 18 |
| Appearance | x | Δ | x | Δ | Δ | ○ | Δ |
| Crystal growth rate (%) | 1500 | 186 | 120 | 117 | 100 | 136 | 289 |

| | Comparative Example | | | | | | |
|---|---|---|---|---|---|---|---|
| | 19 | 20 | 21 | 22 | 23 | 26 | 27 |
| Appearance | x | Δ | Δ | Δ | Δ | x | Δ |
| Crystal growth rate (%) | 1090 | 134 | 106 | 104 | 141 | 123 | 147 |

| | Comparative Example | | | | |
|---|---|---|---|---|---|
| | 28 | 29 | 30 | 31 | 32 |
| Appearance | Δ | ○ | x | Δ | x |
| Crystal growth rate (%) | 123 | 113 | 294 | 127 | 180 |

Appearance evaluation
○: No change,
Δ: Partial change,
x: Significant change
Crystal growth rate (%) = (volume median diameter after 2 weeks at 54° C./initial volume median diameter) × 100

As is clear from Table 2, as for the formulations of Examples, the formulations after 2 weeks at 54° C. were also solid, and thus, there was no change in the appearance. The change in the crystal growth rate was small, and thus, it can be seen that the volume median diameter is also stable. In contrast, as for the flowable agents of Comparative Examples, there were changes in the appearance such as separation and solidification in most of the formulations. In some of the formulations, a marked increase in the volume median diameter was observed. It is considered that these changes are caused by the incompatibility between flometoquin and an active component to be mixed therewith and the interaction among raw materials such as a surfactant in the formulation, which lead to phenomena such as dissolution and precipitation of the active component in the formulation system and result in deterioration in the physical properties of the formulation.

Test Example 2: Comparison of Physical Properties of Formulation after Stability Test at 54° C.

Each of the granular wettable powders of Examples 1, 3 to 9, 11, 13, 15, 17, 19, and 21, and Test groups 33 to 36 was enclosed in a capped 10-mL glass bottle and stored in a constant-temperature oven at 54° C. for 14 days. To a 250-mL capped graduated cylinder, 250 mL of water having a hardness of 3 degrees were placed, 250 mg of the formulation were added thereto. Evaluated was the way in which the granules, after placed into water, fell and disintegrated (disintegratability). Simultaneously, the cylinder was inverted from one minute after the placement into water, at a rate of 30 times per minute, and the number of inversions was counted until complete dispersion. The results are shown in Table 3.

TABLE 3

Comparison of Physical Properties of Formulation before and after Stable Test at 54° C.

| | Product immediately after production | | Product after storage at 54° C. | |
| --- | --- | --- | --- | --- |
| | Disintegratability | Dispersibility (Number of inversions) | Disintegratability | Dispersibility (Number of inversions) |
| Example 1 | o | 2 | o | 2 |
| Example 3 | o | 2 | o | 2 |
| Example 4 | o | 2 | o | 3 |
| Example 5 | o | 4 | o | 5 |
| Example 6 | o | 2 | o | 2 |
| Example 7 | o | 3 | o | 4 |
| Example 8 | o | 3 | o | 4 |
| Example 9 | o | 2 | o | 3 |
| Example 11 | o | 2 | o | 3 |
| Example 13 | o | 2 | o | 3 |
| Example 15 | o | 3 | o | 3 |
| Example 17 | o | 2 | o | 2 |
| Example 19 | o | 6 | o | 8 |
| Example 21 | o | 3 | o | 5 |
| Test group 33 | Δ | 6 | x | >10 |
| Test group 34 | Δ | 8 | x | >10 |
| Test group 35 | x | >10 | x | >10 |
| Test group 36 | x | >10 | x | >10 |

Disintegratability evaluation
o: Disintegrates itself while threading, and falls off.
Δ: Slowly disintegrates and falls off when in placed in water.
x: Reaches the bottom without disintegrating even when placed in water, and does not disintegrate after reaching the bottom.

As is clear from Table 3, the formulations of Examples, even after storage at 54° C., are excellent in disintegratability and dispersibility, After the placement in water, disintegration of the formulations is immediately started, and a homogeneous dispersion state is achieved with a small number of inversions. In contrast, the granular wettable powders of Test groups 33 to 36 are not said to have good disintegratability, and did not complete dispersion of the formulations within 10 times of inversions after the storage at 54° C., It is considered that since Test groups 33 to 36 use the pulverization liquid of the active component such as flometoquin and the like as a raw material, mixing of the (powder) raw materials used in Test groups 33 to 36 with the pulverization liquid distributes fine particles in the pulverization liquid homogeneously in the powder raw materials, which hardens the formulations after extrusion, granulation, and drying, and results in significant deterioration of the disintegratability thereof. From the difference in the configuration between Examples and Test groups 33 to 36, it is conceived that the granular wettable powders desirably contain saccharides. It is also conceived that the granular wettable powders desirably contain white clay, diatomaceous earth, or volcanic ash soil as a mineral powder carrier.

The invention claimed is:

1. A wettable powder composition, comprising flometoquin as an agrochemical active component (A), a saccharide, a mineral powder carrier, at least one surfactant, and optionally at least one additional additive selected from the group consisting of a binder and an inorganic salt,
    wherein the saccharide is at least one selected from the group consisting of lactose, dextrin, a starch derivative and a cellulose derivative, and the mineral powder carrier is at least one selected from the group consisting of white clay, diatomaceous earth and volcanic ash soil,
    wherein the wettable powder composition is solid at 30° C., and
    wherein the agrochemical active component (A) is in a form of a wet-pulverized product obtained by wet pulverization along with the surfactant, and a volume median diameter of the agrochemical active component (A) in a suspension liquid obtained upon wet pulverization is from 0.1 to 5.0 um.

2. The wettable powder composition according to claim 1, further comprising one or more other agrochemical active component (B), wherein a mixture of the agrochemical active component (A) and the agrochemical active component (B) is in a form of a wet-pulverized product obtained by wet pulverization along with the surfactant, and a volume median diameter of the agrochemical active component (A) and the agrochemical active component (B) in a suspension liquid obtained upon wet pulverization is from 0.1 to 5.0 μm.

3. The wettable powder composition according to claim 2, wherein the agrochemical active component (B) is at least one component selected from the group consisting of an insecticide effective component and a fungicide effective component.

4. The wettable powder composition according to claim 2, wherein the agrochemical active component (B) is at least one agent selected from the group consisting of organophosphorus-based, carbamate-based, pyrethroid-based, neonicotinoid-based, nicotine-based, butenolide-based, cyclic diene organochlorine-based, benzene dicarboxamide-based, nereistoxin-based, IGR-based, pyrrole-based, macrolide-based, juvenile hormone analogue-based, benzoylurea-based, spinosyn-based, quinazoline-based, phenylpyrazole-based, oxadiazine-based, hydrazinecarboxamide-based, phenoxybenzylamide-based, pyridineazomethine-based, pyridinecarboxyamide-based, organosilicon-based, tetronic acid-based, β-ketonitrile derivative-based, phosphine-based, METI agent-based, BT agent-based, copper agent-based, sulfur agent-based, polyhaloalkylthio-based, sodium bicarbonate agent-based, organochlorine-based, benzimidazole-based, dicarboximide-based, carboxyamide-based, phenylamide-based, dimethomorph-based, cymoxanil-based, cyanoimidazole-based, acylalanine-based, oxazolidinone-based, butyrolactone-based, hydroxy-(2-amino-)pyrimidine-based, isoxazole-based, isothiazolone-based, carboxylic acid-based, thiophanate-based, N-phenylcarbamate-based, benzamide-based, thiazolecarboxamide-based, phenylurea-based, pyrimidineamine-based, pyrazolecarboxamide-based, phenylbenzamide-based, phenyloxoethyl thiophene-amide-based, pyridinyl ethyl benzamide-based, furancarboxamide-based, oxathiincarboxamide-based, thiazolecarboxamide-based, pyrazolecarboxamide-based, pyridinecarboxamide-based, methoxyacrylate-based, methoxycarbamate-based, oxyiminoacetic acid-based, oxyiminoacetamide-based, oxazolinedione-based, dihydrodioxazine-based, imidazolinone-based, benzylcarbamate-based, cyanoimidazole-based, sulfamoyltriazole-based, dinitrophenylcrotonic acid-based, 2,6-dinitroaniline-based, triphenyltin-based, thiophenecarboxamide-based, thiophenecarboxamide-based, thiazolopyrimidylamine-based, anilinopyrimidine-based, enopyranuronic acid antibiotic-based, hexopyranosyl antibiotic-based, glucopyranosyl antibiotic-based, tetracycline antibiotic-based, allyloxyquinoline-based, quinazoline-based, phenylpyrrole-based, dicarboximide-based, phosphorothiolate-based, dithiolane-based, aromatic hydrocarbon-based, 1,2,4-thiadiazole-based, carbamate-based, polypeptide-based, piperazine-based, pyrimidine-based, pyridine-based, imidazole-based, triazole-based, triazolinthione-based, morpholine-based, piperidine-based, spiroketalamine-based, hydroxyanilide-based, aminopyrazolinone-based, thiocarbamate-based, allylamine-based, peptidylpyrimidine nucleoside-based, cinnamic acid amide-based, valinamide carbamate-based, mandelic acid amide-based, isobenzofuranone-based, pyrroloquinolinone-based, triazolobenzothiazole-based, cyclopropanecarboxamide-based, carboxamide-based, propionamide-based, benzothiadiazole-based, benzisothiazole-based, thiadiazolecarboxamide-based, polysaccharide-based, cyanoacetamide-oxime-based, ethylphosphonate-based, phthalamic acid-based, benzotriazine-based, benzenesulfonic acid-based, pyridazinone-based, thiocarbamate-based, phenylacetamide-based, benzophenone-based, benzoylpyridine-based, guanidine-based, cyanomethylenethiazolidine-based, pyrimidinonehydrazone-based, dithiocarbamate-based, phthalimide-based, chloronitrile-based, sulfamide-based, triazine-based, quinone-based, quinoxaline-based, maleimide-based, and mesoion-based agents.

5. The wettable powder composition according to claim 2, wherein the agrochemical active component (B) is at least one agent selected from the group consisting of diazinon, acephate, azamethiphos, azinphos-ethyl, azinphos-methyl, cadusafos, chlorethoxyfos, chlorfenvinphos, chlormephos, fenitrothion, isoxathion, chlorpyrifos, chlorpyrifos-methyl, coumaphos, cyanophos, dimeton-S-methyl, dichlorvos, dicrotophos, dimethoate, dimethylvinphos, ethylthiometon, EPN, ethion, ethoprophos, famphur, fenamiphos, fenthion, fosthiazate, heptenophos, imicyafos, isofenphos, mecarbam, methamidophos, methidathion, mevinphos, monocrotophos, naled, omethoate, oxydemeton-methyl, parathion, methyl parathion, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, prothiofos, malathion, PAP, DEP, EPN, methomyl, thiodicarb, benfuracarb, carbosulfan, alanycarb, acrinathrin, allethrin, bifenthrin, bioallethrin, bioresmethrin, cycloprothrin, cyfluthrin, cyhalothrin, cypermethrin, cyphenothrin, deltamethrin, empenthrin, esfenvalerate, etofenprox, fenpropathrin, fenvalerate, flucythrinate, flumethrin, fluvalinate, halfenprox, imiprothrin, kadethrin, permethrin, phenothrin, prallethrin, cyhalothrin, tefluthrin, phthalthrin, tralomethrin, transfluthrin, DDT, methoxychlor, imidacloprid, thiamethoxam, clothianidin, acetamiprid, nitenpyram, thiacloprid, dinotefuran, nicotine sulfate, sulfoxaflor, flupyradifurone, hydroprene, kinoprene, methoprene, pyriproxyfen, chlordane, benzoepin, flubendiamide, chlorantraniliprole, cyantraniliprole, thiocyclam, cartap, bensultap, thiosultap, chromafenozide, methoxyfenozide, halofenozide, tebufenozide, chlorfluazuron, trigard, amitraz, hydramethylnon, acequinocyl, fluacrypyrim, fenazaquin, fenpyroximate, pyrimidifen, pyridaben, tebufenpyrad, tolfenpyrad, derris extract, chlorfenapyr, DNOC, sulfluramid, emamectin, lepimectin, milbemectin, abamectin, spinosad, spinetoram, bistrifluron, diflubenzuron, flucycloxuron, hexaflumuron, lufenuron, novaluron, noviflumuron, teflubenzuron, triflumuron, buprofezin, cyromazine, pyrifluquinazon, fipronil, ethiprole, fenoxycarb, indoxacarb, metaflumizone, spirodiclofen, spiromesifen, spirotetramat, pymetrozine, flonicamid, chloropicrin, sulfuryl fluoride, clofentezine, hexythiazox, diflovidazin, etoxazole, diafenthiuron, azocyclotin, tricyclohexyltin hydroxide, fenbutatin oxide, propargite, tetradifon, silafluofen, aluminum phosphide, calcium phosphide, hydrogen phosphide, zinc phosphide, cyenopyrafen, cyflumetofen, azadirachtin, benzoximate, bifenazate, bromopropylate, quinomethionate, sodium aluminum fluoride, dicofol, pyridalyl, inorganic copper, organic copper, inorganic sulfur, polycarbamate, benalaxyl, furalaxyl, metalaxyl, oxadixyl, ofurace, bupirimate, dimethirimol, ethirimol, hydroxyisoxazole, octhilinone, oxolinic acid, benomyl, carbendazol, fuberidazole, thiabendazole, thiophanate, thiophanate-methyl, diethofencarb, zoxamide, ethaboxam, pencycuron, fluopicolide, diflumetorim, benodanil, flutolanil, mepronil, isofetamid, fluopyram, fenfuram, carboxin, oxycarboxin, thifluzamide, benzovindiflupyr, bixafen, fluxapyroxad, furametpyr, isopyrazam, penflufen, penthiopyrad, sedaxane, boscalid, azoxystrobin, coumoxystrobin, enoxastrobin, flufenoxystrobin, picoxystrobin, pyraoxystrobin, pyraclostrobin, pyrametostrobin, triclopyricarb, kresoximmethyl, trifloxystrobin, dimoxystrobin, fenaminstrobin, metominostrobin, orysastrobin, famoxadone, fluoxastrobin, fenamidone, pyribencarb, cyazofamid, amisulbrom, binapacryl, meptyldinocap, dinocap, fluazinam, ferimzone, organotin, silthiofam, ametoctradin, cyprodinil, mepanipyrim, pyrimethanil, blasticidin S, kasugamycin, streptomycin, oxytetracycline, quinoxyfen, proquinazid, fenpiclonil, fludioxonil, chlozolinate, iprodione, procymidone, vinclozolin, edifenphos, iprobenfos, pyrazophos, isoprothiolane, biphenyl, chloroneb, dichloran, quintozene, tecnazene, tolclofos-methyl, echlomezol, iodocarb, propamocarb, prothiocarb, Bacillus subtilis, triforine, pyrifenox, pyrixazole, fenarimol, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, prothioconazole, aldimorph, dodemorph, fenpropimorph, tridemorph, fenpropidin, piperalin, spiroxamine, fenhexamid, fenpyrazamine, pyributicarb, naftifine, terbinafine, validamycin, polyoxin, dimethomorph, flumorph, pyrimorph, benthiavalicarb, iprovalicarb, valifenalate, mandipropamid, fthalide, pyroquilon, tricyclazole, carpropamid, diclocymet, fenoxanil, acibenzolar-S-methyl, probenazole, tiadinil, isotianil, laminarin, cymoxanil, fosetyl, tecloftalam, triazoxide, flusulfamide, diclomezine, methasulfocarb, cyflufenamid, metrafenone, pyriofenone, guanidine, flutianil, ferimzone, ferbam, manzeb, maneb, metiram, propineb, thiuram, zineb, captan, difolatan, folpet, TPN, dichlofluanid, tolylfluanid, guazatine, iminoctadine, triazine, dithianon, quinomethionate, fluoroimide, triflumezopyrim, and dicloromezotiaz.

6. The wettable powder composition according to claim 1, wherein the composition comprises at least one binder selected from the group consisting of polyvinylpyrrolidone, polyvinyl alcohol, methyl cellulose, and carboxymethyl cellulose.

7. The wettable powder composition according to claim 1, wherein the composition comprises at least one inorganic salt selected from the group consisting of potassium dihydrogen phosphate, sodium chloride, potassium chloride, and ammonium sulfate.

8. The wettable powder composition according to claim 1, wherein the surfactant is at least one selected from the group consisting of polyoxyethylene alkylether sulfate, polyoxyethylene ether phosphate, polyoxyethylated castor oil, alkylnaphthalenesulfonate-formaldehyde condensate, dioctyl sulfosuccinate, and polycarboxylic acid.

9. A method for producing the wettable powder composition according to claim 1, comprising a step of wet-pulverizing the agrochemical active component (A) along with the surfactant to obtain a wet-pulverized liquid, wherein a volume median diameter of the agrochemical active component (A) in a suspension liquid obtained by wet pulverization is from 0.1 to 5.0 μm, and combining the wet-pulverized liquid with the saccharide, the mineral powder carrier and optionally the binder and the inorganic salt.

10. A method for producing the wettable powder composition according to claim 2, comprising a step of wet-pulverizing a mixture of the agrochemical active component (A) and the agrochemical active component (B) along with the surfactant to obtain a wet-pulverized liquid, wherein the volume median diameter of the agrochemical active component (A) and the agrochemical active component (B) in a suspension liquid obtained by wet pulverization is from 0.1 to 5.0 μm, and combining the wet-pulverized liquid with the saccharide, the mineral powder carrier and optionally the binder and the inorganic salt.

11. The wettable powder composition according to claim 1, wherein the composition is a wettable powder or a granular wettable powder.

12. The wettable powder composition according to claim 1, wherein the composition is prepared by adding and mixing the saccharide, the mineral powder carrier, and optionally the at least one additive to a pulverized slurry of agrochemical active component (A) to obtain a mixture, and then subjecting the mixture to drying and sieving.

* * * * *